Aug. 16, 1927.  1,639,116
E. TIMBS
PULLEY SUPPORT FOR CROWN BLOCKS
Filed May 26, 1925
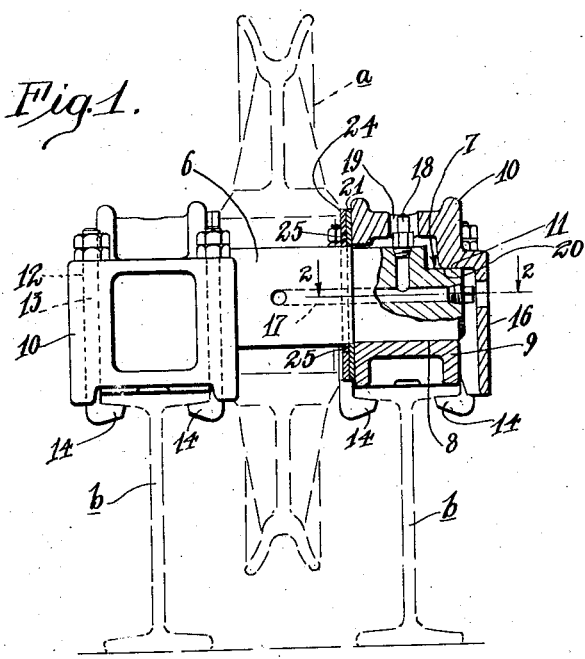
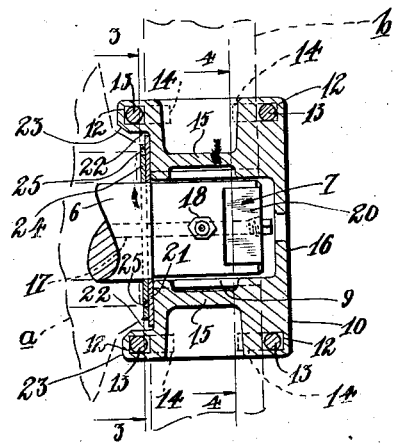
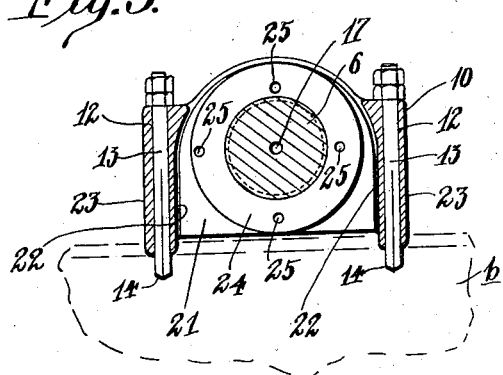
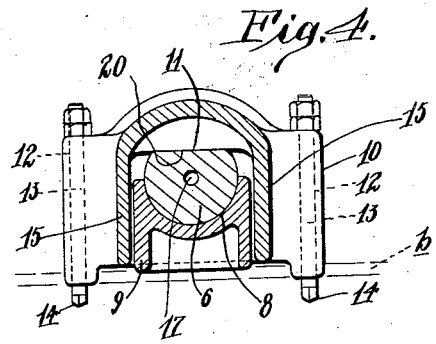
Inventor
Edward Timbs.
By Lyon & Lyon
Attorneys.

Patented Aug. 16, 1927.                                                              1,639,116

UNITED STATES PATENT OFFICE.

EDWARD TIMBS, OF LOS ANGELES, CALIFORNIA, ASSIGNOR TO UNION TOOL COMPANY, OF TORRANCE, CALIFORNIA, A CORPORATION OF CALIFORNIA.

PULLEY SUPPORT FOR CROWN BLOCKS.

Application filed May 26, 1925. Serial No. 33,038.

This invention relates to pulley supports for the crown blocks used on derricks in the drilling of oil wells.

An object of the invention is to effect clamping of the shaft without materially weakening said shaft.

It has been the prior practice in clamping the shafts on which the pulleys are rotatably mounted, to provide the underside of the shaft with a flat surface which rests directly upon the beams that constitute portions of the crown block, and to provide straps that pass over the shaft and are bolted solidly to the flanges of the beams. By the present construction, I avoid the cutting and weakening of the shaft in this manner.

An important object is to provide an effective construction for preventing the pulley from rubbing against the rough cast surfaces of the bearing block and cap.

Other objects and advantages will appear in the subjointed detailed description.

The accompanying drawings illustrate the invention:

Fig. 1 is a longitudinal view, partly in section, of a pulley support constructed in accordance with the provisions of this invention, a pulley and a pair of beams of the crown block being indicated in broken lines.

Fig. 2 is an enlarged fragmental plan section on the line indicated by 2—2, Fig. 1.

Fig. 3 is a sectional elevation on the line indicated by 3—3, Fig. 2.

Fig. 4 is a sectional elevation on the line indicated by 4—4, Fig. 2.

There is provided a shaft 6 adapted to rotatably support a pulley, which is indicated in broken lines at $a$ and which forms no part of the present invention. The shaft is provided with recesses 7 in its upper side at its opposite ends and said shaft rests within concave seats 8 formed in bearing members 9 which are adapted to rest on the upper faces of the top flanges of the I-beams $b$ of the crown block.

The end portions of the shaft 6 are enclosed by caps 10 which extend around the sides and over the outer ends of the bearings 9 and shaft 6 so as to straddle the bearings, being spaced slightly from said bearings and from the shaft excepting where internal flat shoulders 11 of the caps engage and seat upon the upper flat faces 20 of the shaft recesses 7. Each cap is provided with four vertical bolt holes 12 through which extend bolts 13, the lower ends of said bolts having laterally extending shoulders 14 adapted to engage beneath the upper flanges of the I-beams $b$. These bolts serve the double purpose of holding the caps 10 and bearings 9 stationary. The side walls of each cap 10 are indicated at 15 and the end wall at 16.

To feed lubricant to the pulley $a$ the shaft 6 is provided with a duct 17 which opens through the upper face of the shaft and which communicates with a filling nipple 18 which projects into an opening 19 in the upper face of one of the caps.

To operate the invention, a pulley will be mounted on the shaft 6 and then the shaft will be placed in the bearing seats 8 with the recesses 7 uppermost. The caps 10 will then be placed in position to rest the shoulders 11 upon the upper faces of the recesses and the bolts will be secured to the I-beams.

It will be seen that the bearings 9 and caps are slidable to any desired position along the beams before the bolts are secured, thus making the support readily adjustable so as to support the pulley in the desired position on the crown block relative to the other pulleys thereof.

Adjacent to the inner ends of the bearing blocks 9 and caps 10 are wear plates 21 that thrust against the blocks and caps at these ends which may be left rough as cast. These plates 21 have straight side edges that engage shoulders 22 formed by ears 23 through which some of the bolts 13 pass, thus to prevent rotation of the plates 21 in contact with the relatively rough blocks and caps and thus preventing excessive wear of the plates. The shaft 16 extends through the plates 21 and also through circular wear plates 24 which are interposed between the plates 21 and the end faces of the hub of the pulley $a$ so that when contact between the pulley and the plates 24 occurs the plates 24 will rub against the plates 21.

It is advisable to lubricate the adjacent faces of the plates 21, 24 and, accordingly, the plates 24 are provided with openings 25 through which lubricant may pass from the hub bore or pulley bearing to said faces.

I claim:

1. A pulley support for a crown block, comprising a shaft having recesses in its upper side at its opposite ends, bearings having concave seats for the shaft to rest in, caps straddling the bearings provided with internal shoulders engaging in the recesses, and means passing through the caps outside of the bearings to secure the caps to beams.

2. A pulley support for a crown block, comprising a shaft having recesses in its upper side at its opposite ends, bearings having concave seats for the shaft to rest in, caps provided with internal shoulders engaging in the recesses, said caps enclosing the bearings and the end portions of the shafts, and means passing through the caps outside of the bearings to secure the caps to beams.

3. A pulley support for a crown block, comprising a shaft having recesses in its upper side at its opposite ends, bearings having concave seats for the shaft to rest in, caps provided with internal shoulders engaging in the recesses, and bolts passing through the caps straddling the bearings and outside of the bearings and provided with shoulders adapted to engage beneath the flanges of I-beams on which the bearings rest.

4. A pulley support for a crown block, comprising a shaft having recesses in its upper side at its opposite ends, bearings having concave seats for the shaft to rest in, caps provided with internal shoulders engaging in the recesses, the caps having side walls extending down at the sides of the shaft and the caps having end walls extending down at the ends of the shaft, and means to secure the caps to beams.

5. A pulley support for a crown block, comprising a shaft having recesses in its upper side at its opposite ends, bearings having concave seats for the shaft to rest in, caps straddling the bearings and provided with internal shoulders engaging in the recesses, and bolts extending through the caps outside of the bearings and having shoulders to engage beneath the flanges of I-beams on which the bearings rest.

6. A pulley support for a crown block, comprising a shaft, bearing blocks having concave seats for the shaft to rest in, caps for the bearing blocks having shoulders, cooperating means between the shaft and caps to prevent turning of the shaft, means to secure the caps to beams, wear plates adjacent to the inner ends of the bearing blocks and having straight edges to engage the shoulders to prevent turning of said plates, and other wear plates to engage the first mentioned wear plates provided with openings for the passage of a lubricant.

7. A pulley support for a crown block, comprising a shaft having recesses in its upper side at its opposite ends, bearings having concave seats for the shaft to rest in, caps provided with internal shoulders engaging in the recesses, said caps having ears extending beyond the planes of the adjacent ends of the bearings on opposite sides of the bearings, and bolts extending through the ears and having shoulders to engage beneath the flanges of I-beams on which the bearings rest.

8. A pulley support for a crown block, comprising a shaft having recesses in its upper side at its opposite ends, bearings having concave seats for the shaft to rest in, caps provided with internal shoulders engaging in the recesses, said caps having ears forming shoulders, bolts extending through the ears and having shoulders to engage beneath the flanges of I-beams on which the bearings rest, wear plates adjacent to the inner ends of the bearings provided with straight side edges engaging the second shoulders, and circular wear plates surrounding the shaft adjacent to the first plates and provided with openings for lubricant.

Signed at Los Angeles, California, this 18th day of May, 1925.

EDWARD TIMBS.